Aug. 4, 1925.
W. S. MOODY
1,548,733
METHOD AND APPARATUS FOR TREATING OIL
Filed Aug. 15, 1924
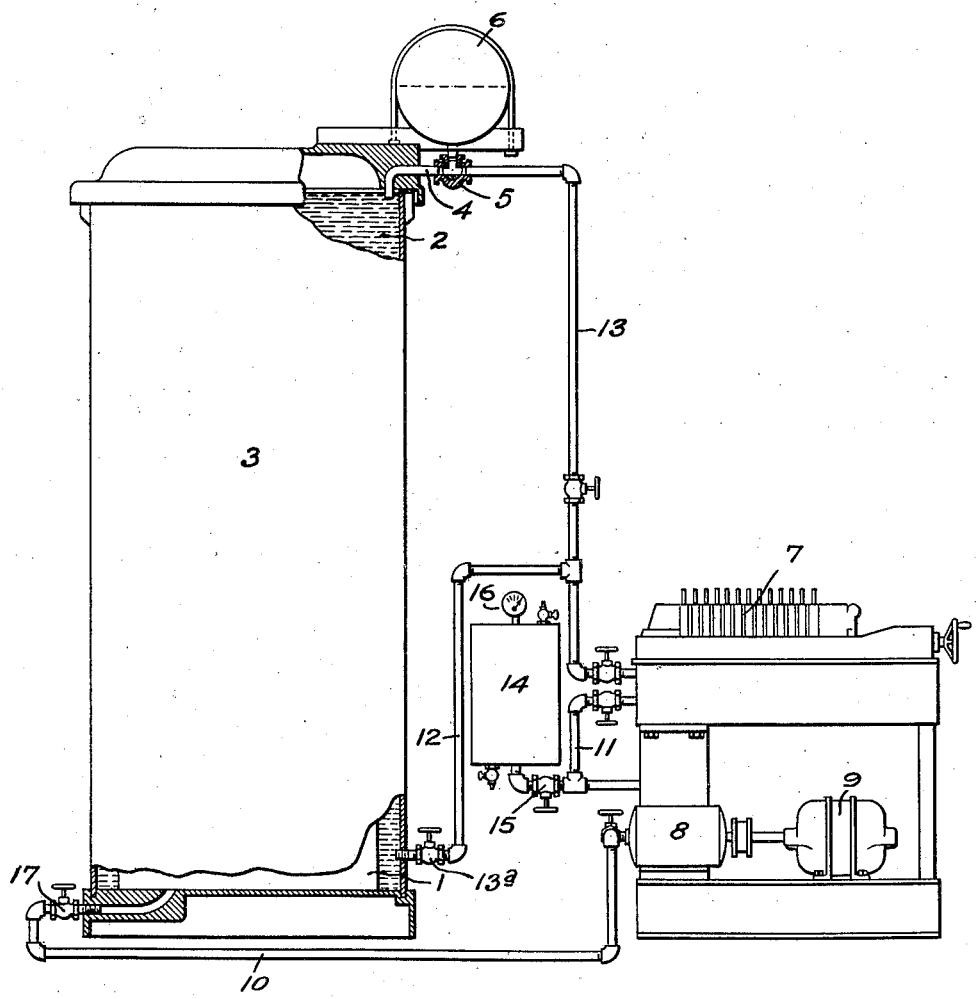
Inventor:
Walter S. Moody,
by Alexander S. ___
His Attorney.

Patented Aug. 4, 1925.

1,548,733

UNITED STATES PATENT OFFICE.

WALTER S. MOODY, OF PITTSFIELD, MASSACHUSETTS, ASSIGNOR TO GENERAL ELECTRIC COMPANY, A CORPORATION OF NEW YORK.

METHOD AND APPARATUS FOR TREATING OIL.

Application filed August 15, 1924. Serial No. 732,289.

*To all whom it may concern:*

Be it known that I, WALTER S. MOODY, a citizen of the United States, residing at Pittsfield, in the county of Berkshire, State of Massachusetts, have invented certain new and useful Improvements in Methods and Apparatus for Treating Oil, of which the following is a specification.

My invention relates to a method and apparatus for treating oil, such as is used for insulating and cooling transformers and other electrical apparatus. The oil in which electrical apparatus is immersed must be protected from moisture and from contact with air in order that its dielectric strength may not be impaired. It is customary to provide such protection in the case of an oil immersed transformer by means of an auxiliary expansion chamber which permits expansion and contraction of the oil but which constitutes a trap to prevent any air or moisture from reaching the main body of oil around the transformer. Even with all the precaution that may be taken, however, it is often found that the oil in which such apparatus is immersed has become contaminated and its dielectric strength impaired. The oil must then be purified. During this purifying process, it is very desirable that the oil be protected from contact with air as it will absorb a considerable amount of any air with which it may come in contact. For this reason, the oil in the casing of electrical apparatus is often purified by pumping it from the bottom of the casing through a suitable purifying device such as a filter and thence back into the casing, the oil being prevented from reaching any outside air so long as the joints in the piping, pump and purifying device are air tight. It has been found in practice, however, that occasional leaky joints in the piping back of the pump permit air to be drawn into the piping because of the reduced pressure of the oil due to the suction of the pump and such leaks have usually escaped detection because there is nothing outside the piping to indicate their presence. The air thus drawn into the oil passes along with it into the apparatus casing where it may contaminate the main body of oil to a serious extent. The general object of the invention is to provide a process and means whereby any leaks in the oil purifying device or in any of its connections may be detected with ease and certainty. In attaining this object, a gas cushion is arranged to be compressed by the same pump which is used to force the oil through the purifying device, the pressure of this gas cushion then being utilized to raise the pressure of the oil in the purifying device and its connections above that in the surrounding air so that any leaks will be evidenced by an outward flow of oil at the leaks.

The invention will be better understood from the following description taken in connection with the accompanying drawing which shows an oil purifying system connected to the casing of an oil immersed transformer and equipped with means for testing the tightness of the joints in accordance with the invention.

The invention will be described in connection with a commonly used arrangement of apparatus for purifying the oil in a transformer casing as shown in the drawing. A transformer 1 is immersed in a body of oil 2 within a casing 3, the oil extending up through a pipe 4 and a three-way valve 5 into an expansion chamber 6. This expansion chamber permits free expansion and contraction of the oil in the casing 3 under the influence of varying temperature.

When it is found desirable to purify the oil in which the transformer is immersed, it may be forced through a purifying device 7 by means of a pump 8 driven by a motor 9. The purifying device 7 is shown in the drawing in the form of what is commonly known as a filter press in which the oil is forced through sheets of filter paper to remove sediment and moisture. The pump 8 draws the oil from the bottom of the transformer casing 3 through a pipe 10 and then forces it through a pipe 11 to the filter press 7. After being purified in the filter press, the oil may return to the bottom of the casing 3 through the pipe 12 or to the top of the casing 3 through the pipe 13, the path of the oil being determined by the positions of the valves 13ª and 5. The valve 5 is a three-way valve which may connect the pipe 4 with the expansion chamber 6 and shut off the pipe 13 when the filter press is not being used or it may connect the pipe 4 with both the expansion chamber 6 and the pipe 13 while the oil is being filtered.

It has been found that during the purifying or filtering process, the pump 8 may often reduce the pressure of the oil in the intake side of the pump and in the pipe 10 back of the pump until it is below that of the air outside. When this occurs, air may be drawn into the oil back of the pump through unsuspected leaks and pass along into the main body of oil in the casing 3. The invention provides a method and means for easily determining whether such leaks exist and for detecting and locating them easily if any do exist.

In accordance with the invention, a chamber 14 adapted to hold a body of gas under pressure is connected to the piping beyond the pressure or outlet side of the pump and preferably close to the pump. As shown in the drawing, this gas chamber is connected to the pipe 11 between the pump and the filter press. The chamber 14 is filled with any suitable gas such as nitrogen or air. If air is used, the oxygen of the air will be gradually absorbed by the oil, but the amount of oxygen is usually too small to be objectionable.

The filter press and pump and their pipe connections may now be tested for leaks before being used to purify the oil in the casing 3. The pump is started with the pipe 13 closed at the valve 5 and the pipe 12 closed at the valve 13ª. A valve 15 in the pipe connection to the gas chamber 14 is left open and the pump forces oil into this gas chamber until the pressure of the gas is raised to some suitable value such as fifteen or twenty pounds as indicated on a pressure gauge 16 and then the pipe 10 is closed at the valve 17 and the pump stopped. This permits the pressure of the gas in the gas chamber 14 to be transmitted back through the oil to the filter press 7, the pump 8 and all parts of the pipe connections as far as the closed valves 5, 13ª and 17. The pump should be of some suitable type such as will permit a reverse flow when it is stopped. Any leaks will permit oil to be forced through them by the pressure inside and they may be easily detected and located by the appearance of the leaking oil. If, however, the joints are all perfectly tight, this will be indicated by the fact that no oil will appear outside and the internal pressure may be maintained indefinitely.

Any leaks which may be detected should of course be made tight before the filter press is used. The gas chamber 14 has the advantage not only that it may be used to furnish pressure in the oil back of the pump, but it may also furnish pressure ahead of the pump for an indefinite time without the necessity of continuous operation of the pump.

What I claim as new and desire to secure by Letters Patent of the United States, is:—

1. The method of testing tightness of joints in apparatus comprising an oil purifier and a pump for forcing oil through said purifier, said method comprising the steps of operating said pump to compress a body of gas in communication with the oil ahead of the pump, and stopping said pump to permit the pressure of the gas to be transmitted to the oil back of the pump.

2. The method of testing tightness of joints in apparatus comprising an oil purifier and a pump for forcing oil through said purifier, said method comprising the steps of operating said pump to compress a body of gas in communication with the oil ahead of the pump, closing the oil passage back of the pump, and stopping said pump to permit the pressure of the gas to be transmitted to the oil back of the pump.

3. The combination with a casing for oil immersed electrical apparatus, of an oil purifier, a pump and pipe connections for drawing oil from said casing and forcing it through said purifier back into the casing, and a pressure chamber communicating with the oil passage ahead of said pump to hold a body of gas under pressure induced by said pump.

4. The combination with a casing for oil immersed electrical apparatus, of an oil purifier, a pump and pipe connections for drawing oil from said casing and forcing it through said purifier back into the casing, means for closing the oil passage back of said pump, and a pressure chamber communicating with the oil passage ahead of said pump to hold a body of gas under pressure induced by said pump.

In witness whereof, I have hereunto set my hand this 13th day of Aug., 1924.

WALTER S. MOODY.